United States Patent
Klemarczyk et al.

(10) Patent No.: US 6,342,545 B1
(45) Date of Patent: Jan. 29, 2002

(54) RADICAL-CURABLE ADHESIVE COMPOSITIONS, REACTION PRODUCTS OF WHICH DEMONSTRATE SUPERIOR RESISTANCE TO THERMAL DEGRADATION

(75) Inventors: Philip T. Klemarczyk, Collinsville; Maria L. Masterson, Cromwell, both of CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/197,447

(22) Filed: Nov. 23, 1998

(51) Int. Cl.⁷ .................................................. C08J 4/00
(52) U.S. Cl. ...................................................... 523/176
(58) Field of Search .......................................... 523/176

(56) References Cited

U.S. PATENT DOCUMENTS

| | | | |
|---|---|---|---|
| 3,218,305 A | 11/1965 | Krieble | 260/89.5 |
| 3,988,299 A | 10/1976 | Malofsky | 260/47 |
| 4,049,750 A | 9/1977 | Brenner | 260/864 |
| 4,107,109 A | 8/1978 | Kassal | 260/4 R |
| 4,180,640 A | 12/1979 | Melody | 526/353.1 |
| 4,209,604 A | 6/1980 | Werber | 526/270 |
| 4,273,851 A * | 6/1981 | Muzyczko | 430/175 |
| 4,287,330 A | 9/1981 | Rich | 526/270 |
| 4,321,349 A | 3/1982 | Rich | 526/270 |
| 4,384,101 A | 5/1983 | Kovacs | 528/73 |
| 4,439,600 A * | 3/1984 | Moran | 528/392 |
| 4,524,176 A | 6/1985 | Pike | 525/12 |
| 4,546,155 A | 10/1985 | Hirose | 525/504 |
| 4,578,315 A * | 3/1986 | Santorelli | 428/414 |
| 4,600,738 A | 7/1986 | Lamm | 523/500 |
| 4,624,725 A | 11/1986 | Lamm | 156/310 |
| 5,023,107 A | 6/1991 | Roberts | 427/2 |
| 5,179,172 A * | 1/1993 | Chan | 525/328.9 |
| 5,270,362 A * | 12/1993 | Palmer | 524/81 |
| 5,326,827 A | 7/1994 | Aoki | 525/337 |
| 5,395,566 A | 3/1995 | Kobayakawa | 252/586 |
| 5,468,886 A | 11/1995 | Steinmann | 549/549 |
| 5,599,651 A | 2/1997 | Steinmann | 430/280.1 |
| 5,618,857 A | 4/1997 | Newberth | 523/176 |
| 5,630,978 A * | 5/1997 | Domb | 264/330 |
| 5,656,703 A | 8/1997 | Costin | 525/531 |

OTHER PUBLICATIONS

R.D. Rich, "Anaerobic Adhesives", *Handbook of Adhesive Technology*, 29, 467–79, A. Pizzi and K.L. Mittal, eds., Marcel Dekker. Inc. New York (1994).

J.G. Woods, "Radiation Curable Adheisves", *Radiation Curing: Science and Technology*, 333–98. S.P. Pappas, ed., Plenum Press, New York (1992).

L.J. Baccei and B.M. Malofsky, "Anaerobic Adhesives Containing Maleimides Having Improved Thermal Resistance", *Adhesive Chemicals*, 589–601, L–H Lee, ed., Plenum Publishing Corp. (1984).

J. Woods et al., "Alkenyloxy Styrene Monomers for High–Temperature Adhesives and Sealants" in *Photopolymerization*, ch. 9, pp 107–120 (1997).

* cited by examiner

*Primary Examiner*—Edward J. Cain
(74) *Attorney, Agent, or Firm*—Steven C. Bauman

(57) ABSTRACT

The present invention is directed to a radical-curable adhesive composition which includes a (meth)acrylate composition; a thermal resistance-conferring agent; and a radical cure-inducing composition. Reaction products of compositions in accordance with this invention exhibit superior resistance to thermal degradation.

13 Claims, 7 Drawing Sheets

RADICAL-CURABLE ADHESIVE COMPOSITIONS, REACTION PRODUCTS OF WHICH DEMONSTRATE SUPERIOR RESISTANCE TO THERMAL DEGRADATION

BACKGROUND OF THE INVENTION

1. Field of the Invention

The present invention is directed to radical-curable adhesive compositions which include a (meth)acrylate component; a thermal resistance-conferring agent; and a radical cure-inducing composition. Reaction products of the compositions of this invention exhibit superior resistance to thermal degradation.

2. Brief Description of the Technology

Radical-curable adhesive compositions generally are well-known. In the context of anaerobic adhesives, see e.g., R. D. Rich, "Anaerobic Adhesives" in *Handbook of Adhesive Technology*, 29, 467–79, A. Pizzi and K. L. Mittal, eds., Marcel Dekker. Inc., New York (1994) and references cited therein. In the context of radiation-curable adhesives, see e.g., J.G. Woods, "Radiation Curable Adhesives" in *Radiation Curing: Science and Technology*, 333–98, S. P. Pappas, ed., Plenum Press, New York (1992).

Uses of radical-curable adhesives are legion and new applications continue to be developed.

In the past, many adhesives particularly anaerobic adhesives, have been rendered resistant to degradation at elevated temperatures by the inclusion of certain additives.

For instance, U.S. Pat. No. 3,988,299 (Malofsky) refers to a heat curable composition having improved thermal properties, which includes certain acrylate monomers and maleimide compounds.

L. J. Baccei and B. M. Malofsky, "Anaerobic Adhesives Containing Maleimides Having Improved Thermal Resistance" in *Adhesive Chemicals*, 589–601, L-H, Lee, ed., Plenum Publishing Corp. (1984) report the use of maleimides—specifically, N-phenyl maleimide, m-phenylene dimaleimide and a reaction product of methylene dianiline and methylene dianiline bismaleimide—to increase the thermal resistance of anaerobic adhesives which are fully cured at temperatures of at least 150° C.

While the addition to radical-curable adhesive compositions of such maleimide compounds to render them resistant to thermal degradation provides reaction products with acceptable performance, it would be desirable to find alternative compounds to include in such formulations. Moreover, maleimides are known to inhibit photoinitated cure of acrylate-based compositions.

Curing agents for epoxy-containing compounds are known, such as those commercially available from Ajinomoto Co., Tokyo, Japan under the tradename "AJICURE", for instance, "AJICURE" PN-23. See U.S. Pat. No. 4,546,155 (Hirose).

Notwithstanding the state-of-the-technology, there is an on-going search for additives to improve the thermal performance of reaction products of radical-curable adhesives. In addition, it would be desirable from a commercial, economic, environmental, supply and regulatory standpoint to provide alternatives and/or replacements for maleimide-type materials for improving the resistance to thermal degradation of reaction products of radical-curable adhesive compositions.

SUMMARY OF THE INVENTION

The present invention meets the desire discussed above by providing radical-curable adhesive compositions, reaction products of which exhibit superior performance at elevated temperatures. The compositions include a (meth)acrylate component; a thermal-resistance conferring agent; and a radical cure-inducing composition.

In another aspect of this invention, radiation-curable compositions are provided, reaction products of which demonstrate superior resistance to thermal degradation.

The invention also provides a process for preparing reaction products from the radical-curable adhesive compositions of the present invention, the steps of which include applying the composition to a desired substrate surface and exposing the coated substrate surface to conditions which are appropriate to effect cure thereof—e.g., exposure to conditions in which air is substantially excluded therefrom for anaerobic application or exposure to radiation in the electromagnetic spectrum for photoinitated applications.

In addition, the invention provides a process for preparing the radical-curable adhesive compositions of the present invention, the steps of which include combining with mixing the (meth)acrylate component, the thermal resistance-conferring agent, and the radical cure-inducing composition.

Also, the invention provides the reaction products so-formed by the above-described process, which reaction products demonstrate superior thermal properties, such as resistance to degradation at elevated temperatures.

The present invention will be more fully appreciated by a reading of the section entitled, "Detailed Description of the Invention", together with the illustrative examples which follow thereafter and the figures.

DETAILED DESCRIPTION OF THE INVENTION

Figure 1:
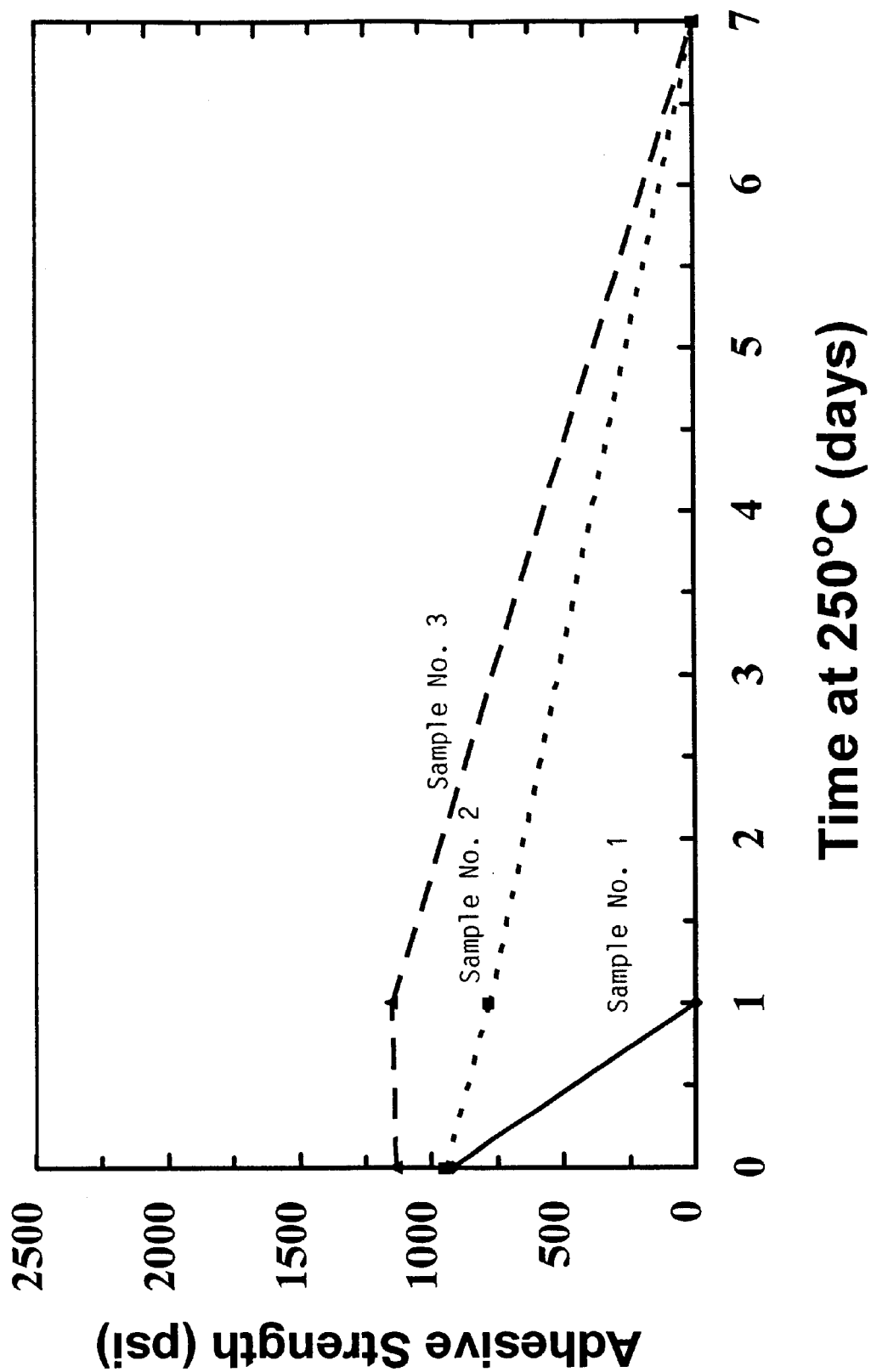
FIG. 1 depicts a plot of adhesive strength over time at a temperature of 250° C. for a reaction product of an anaerobic adhesive based on TRIEGMA, both with and without "AJICURE" PN-23 as a thermal resistance-conferring agent.

As noted above, the present invention is directed to radical-curable adhesive compositions which include a (meth)acrylate component; a thermal resistance-conferring agent as set forth herein; and a radical cure-inducing composition. Reaction products of the compositions of this invention exhibit superior performance, particularly under elevated temperature conditions.

The (meth)acrylate monomer suitable for use in the present invention may be chosen from a wide variety of materials represented by $H_2C=CGCO_2R^1$, where G may be hydrogen, halogen or alkyl of 1 to about 4 carbon atoms, and $R^1$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulonate, sulfone and the like.

More specific (meth)acrylate monomers particularly desirable for use herein include polyethylene glycol di(meth)acrylates, bisphenol-A di(meth)acrylates, such as ethoxylated bisphenol-A (meth)acrylate ("EBIPMA"), and tetrahydrofurane (meth)acrylates and di(meth)acrylates, citronellyl acrylate and citronellyl methacrylate ("CTMA"), hydroxypropyl (meth)acrylate, hexanediol di(meth)acrylate, trimethylol propane tri(meth)acrylate, tetrahydrodicyclopentadienyl (meth)acrylate, ethoxylated trimethylol propane triacrylate ("ETMPTA"), triethylene glycol acrylate and triethylene glycol methacrylate ("TRIEGMA"), and an acrylate ester corresponding to structure I as shown below:

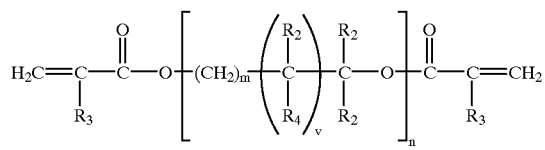

I where $R_2$ may be selected from hydrogen, alkyl of 1 to about 4 carbon atoms, hydroxyalkyl of 1 to about 4 carbon atoms or

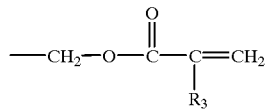

$R_3$ may be selected from hydrogen, halogen, and alkyl of 1 to about 4 carbon atoms;

$R_4$ may be selected from hydrogen, hydroxy and

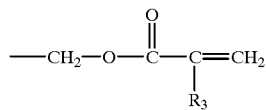

m is an integer equal to at least 1, e.g., from 1 to about 8 or higher, for instance, from 1 to about 4;

n is an integer equal to at least 1, e.g., 1 to about 20 or more; and v is 0 or 1.

Of course, combinations of these (meth)acrylate monomers may also be used.

The (meth)acrylate component should be present in the inventive compositions in an amount within the range of from about 10 to about 90, such as about 50 parts per hundred ("phr").

As the thermal resistance-conferring agent to impart the desirable property of resistance to thermal degradation at elevated temperatures, latent imidizoles and imidizole derivatives may be employed. More specifically, methyl imidizole, benzoyl imidizole, benzoyl methylimidizole, phthaloyldiimidizole, and those adducts disclosed in U.S. Pat. No. 4,546,155 (Hirose), the disclosure of which is hereby expressly incorporated herein by reference, may be employed. For instance, the adducts disclosed in the '155 patent are obtained by reacting a compound having an active hydrogen together with a tertiary amino group in the molecule (such as imidizole derivatives), an epoxy compound and a carboxylic acid anhydride.

Of course, combinations of these thermal resistance-conferring agents may also be employed.

Thermal resistance-conferring agent should be present generally within the range of from about 1 phr to about 30 phr, with about 10 phr to about 20 phr being particularly desirable.

Radical cure-inducing compositions may be chosen from those which initiate cure through anaerobic mechanisms, photoinitiated (such as UV radiation and UV/VIS radiation) mechanisms, thermally-induced mechanisms and the like.

Anaerobic cure-inducing compositions useful in anaerobically-curable compositions in accordance with the present invention include a variety of components, such as amines (including amine oxides, sulfonamides and triazines). A desirable composition to induce cure in accordance with the present invention includes saccharin, toluidenes, such as N,N-diethyl-p-toluidene and N,N-dimethyl-o-toluidene, acetyl phenylhydrazine, and maleic acid. Of course, other materials known to induce anaerobic cure may also be included or substituted therefor. See e.g., U.S. Pat. No. 3,218,305 (Krieble), U.S. Pat. No. 4,180,640 (Melody), U.S. Pat. No. 4,287,330 (Rich) and U.S. Pat. No. 4,321,349 (Rich). Quinones, such as napthoquinone and anthraquinone, may also be included to scavenge free radicals which form.

Photoinitiated cure-inducing compositions may be chosen from a variety of materials, such as those commercially available from Ciba Specialty Chemicals Corp., Tarrytown, New York under the tradename "IRGACURE" and "DAROCUR", such as "IRGACURE" 184 (1-hydroxycyclohexyl phenyl ketone), 907 (2-methyl-1-[4-(methylthio)phenyl]-2-morpholino propan-1-one), 369 [2-benzyl-2-N,N-dimethylamino-1-(4-morpholinophenyl)-1-butanone], 500 (the combination of 1-hydroxy cyclohexyl phenyl ketone and benzophenone), 651 (2,2-dimethoxy-2-phenyl acetophenone), 1700 [the combination of bis(2,6-dimethoxybenzoyl-2,4-,4-trimethyl pentyl) phosphine oxide and 2-hydroxy-2-methyl-1-phenyl-propan-1-one] and "DAROCUR" 1173 (2-hydroxy-2-methyl-1-phenyl-1-propane) and 4265 (the combination of 2,4,6-trimethylbenzoyldiphenyl-phosphine oxide and 2-hydroxy 2-methyl-1-phenyl-propan-1-one); photoinitiators available commercially from Union Carbide Chemicals and Plastics Co. Inc., Danbury, Conn. under the "CYRACURE" tradename, such as "CYRACURE" UVI-6974 (mixed triaryl sulfonium hexafluoroantimonate salts) and UVI-6990 (mixed triaryl sulfonium hexafluorophosphate salts); and the visible light [blue] photoinitiators, dl-camphorquinone and "IRGACURE" 784DC.

Additional photoinitiated cure-inducing compositions may be chosen from those available from Sartomer, Inc., Exton, Pa. under the tradenames "ESACURE" and "SARCAT". Examples include "ESACURE" KB1 (benzil dimethyl ketal), "ESACURE" EB3 (mixture of benzoin and butyl ethers), "ESACURE" TZT (trimethylbenzophenone blend), "ESACURE" KIP100F (α-hydroxy ketone), "ESACURE" KIP150 (polymeric hydroxy ketone), "ESACURE" KT37 (blend of "ESACURE" TZT and KIP150), "ESACURE" KT046 (blend of triphenyl phosphine oxide, "ESACURE" KIP150 and TZT), "ESACURE" X33 (blend of 2- and 4-isopropylthioxanthone, ethyl 4-(dimethyl amino) benzoate and "ESACURE" TZT], "SARCAT" CD 1010 [triaryl sulfonium hexafluoroantimonate (50% in propylene carbonate)], "SARCAT" DC 1011 [triaryl sulfonium hexafluorophosphate (50% n-propylene carbonate)], "SARCAT" DC 1012 (diaryl iodonium hexafluoroantimonate), and "SARCAT" K185 [triaryl sulfonium hexafluorophosphate (50% in propylene carbonate)].

Of course, combinations of such photoinitiated cure-inducing compositions may be used as deemed appropriate by those of ordinary skill in the art.

Thermally-activated latent curing compositions may be chosen from those available commercially from E. I. duPont and de Nemeurs, Wilmington, Del. under the tradenames "LUPERSOL", "DELANOX-F", "ALPEROX-F", "LUCIDOL", "LUPERCO", and "LUPEROX".

Examples include "LUPERSOL" DDM-9 (mixtures of peroxides and hydroperoxides), "LUPERSOL" DDM-30 (mixtures of peroxides and hydroperoxides), "LUPERSOL" DELTA-X-9 (mixtures of peroxides and hydroperoxides), "LUPERSOL" DHD-9 (mixtures of peroxides and hydroperoxides), "LUPERSOL" DFR (mixtures of peroxides and hydroperoxides), "LUPERSOL" DSW-9 (mixtures of peroxides and hydroperoxides), "LUPERSOL" 224 (2,4-pentanedione peroxide), "LUPERSOL" 221 [di(n-propyl) peroxydicarbonate], "LUPERSOL" 225 [di(s-butyl) peroxydicarbonate], "LUPERSOL" 225-M75 [di(s-butyl) peroxydicarbonate], "LUPERSOL" 225-M60 [di(s-butyl) peroxydicarbonate], "LUPERSOL" 223 [di(2-ethylhexyl) peroxydicarbonate], "LUPERSOL" 223-M75 [di(2-ethylhexyl)peroxydicarbonate], "LUPERSOL" 223-M40 [di(2-ethylhexyl)peroxydicarbonate], "LUPERSOL" 219-M60 (diisononanoyl peroxide), "LUCIDOL" 98 (benzoyl peroxide), "LUCIDOL" 78 (benzoyl peroxide), "LUCIDOL" 70 (benzoyl peroxide), "LUPERCO" AFR-400 (benzoyl peroxide), "LUPERCO" AFR-250 (benzoyl peroxide), "LUPERCO" AFR-500 (benzoyl peroxide), "LUPERCO" ANS (benzoyl peroxide), "LUPERCO" ANS-P (benzoyl peroxide), "LUPERCO" ATC (benzoyl peroxide), "LUPERCO" AST (benzoyl peroxide), "LUPERCO" AA (benzoyl peroxide), "LUPERCO" ACP (benzoyl peroxide), "LUPERSOL" 188M75 (α-cumylperoxy neodecanoate), "LUPERSOL" 688T50 (1,1-dimethyl-3-hydroxy-butyl peroxyneoheptanoate), "LUPERSOL" 688M50 (1,1-dimethyl-3-hydroxy-butyl peroxyneoheptanoate), "LUPERSOL" 288M75 (α-cumyl peroxyneoheptanoate), "LUPERSOL" 546M75 (t-amylperoxy neodecanoate), "LUPERSOL" 10 (t-butylperoxy neodecanoate), "LUPERSOL" 10M75 (t-butylperoxy neodecanoate), "LUPERSOL" 554M50 (t-amylperoxypivalate), "LUPERSOL" 554M75 (t-amylperoxypivalate), "LUPERSOL" 11 (t-butylperoxypivalate), "LUPERSOL" 665T50 (1-1-dimethyl-3-hydroxy-butylperoxy-2-ethylhexanoate), "LUPERSOL" 665M50 (1-1-dimethyl-3-hydroxy-butylperoxy-2-ethylhexanoate), "LUPERSOL" 256 [2,5-dimethyl-2,5-di(2-ethylhexanoyl peroxy)hexane], "LUPERSOL" 575 (t-amylperoxy-2-ethyl-hexanoate), "LUPERSOL" 575P75 (t-amylperoxy-2-ethyl-hexanoate), "LUPERSOL" 575M75 (t-amylperoxy-2-ethyl-hexanoate), t-butyl peroctoate (t-butylperoxy-2-ethylhexanoate), "LUPERSOL" PMS (t-butylperoxy-2-ethylhexanoate), "LUPERSOL" PDO (t-butylperoxy-2-ethylhexanoate), "LUPERSOL" 80 (t-butyl peroxyisobutyrate), "LUPERSOL" PMA (t-butyl peroxymaleic acid), "LUPERCO" PMA-25 (t-butyl peroxymaleic acid), "LUPERSOL" 70 (t-butyl peroxyacetate), "LUPERSOL" 75-M (t-butyl peroxyacetate), "LUPERSOL" 76-M (t-butyl peroxyacetate), "LUPERSOL" 555M60 (t-amyl peroxyacetate), "LUPERSOL" KDB (di-t-butyl diperoxyphthalate), "LUPERSOL" TBIC-M75 (OO-t-butyl-O-isopropyl monoperoxycarbonate), "LUPEROX" 118 [2,5-dimethyl-2,5-di(benzoylperoxy)hexane], "LUPERSOL" TBEC [OO-t-butyl-O-(2-ethylhexyl) monoperoxycarbonate], "LUPERSOL" TAEC [OO-t-amyl-O-(2-ethylhexyl)monoperoxycarbonate], "LUPEROX" 500R (dicumyl peroxide), "LUPEROX" 500T (dicumyl peroxide), "LUPERCO" 500-40C (dicumyl peroxide), "LUPERCO" 500-40E (dicumyl peroxide), "LUPERCO" 500-SRK (dicumyl peroxide), "LUPERSOL" 101 [2,5-dimethyl-2,5-di-(t-butylperoxy)hexane], "LUPERSOL" 101-XL [2,5-dimethyl-2,5-di-(t-butylperoxy) hexane], "LUPERCO" 101-P20 [2,5-dimethyl-2,5-di-(t-butylperoxy) hexane], "LUPERSOL" 801 (t-butyl cumyl peroxide), "LUPERCO" 801-XL (t-butyl cumyl peroxide), "LUPEROX" 802 [αα-bis(t-butylperoxy) diisopropylbenzene], "LUPERCO" 802-40KE [αα-bis(t-butylperoxy)diisopropylbenzene], "LUPERSOL" 130 [2,5-dimethyl-2,5-di-(t-butylperoxy)hexyne-3], "LUPERCO" 130-XL [2,5-dimethyl-2, 5-di-(t-butylperoxy )hexyne-3], "LUPEROX" 2,5-2,5 (2,5-dihydro-peroxy-2,5-dimethylhexane), "LUPERSOL" 230 [n-butyl-4,4-di-(t-butylperoxy)valerate], "LUPERCO" 230-XL [n-butyl-4,4-di-(t-butylperoxy)valerate], "LUPERSOL" 231 [1,1-di(t-butylperoxy)-3,3,5-trimethyl cyclohexane], "LUPERCO" 231-XL [1,1-di(t-butylperoxy) 3,3,5-trimethyl cyclohexane], "LUPERSOL" 231-P75 [1,1-di(t-butylperoxy) 3,3,5-trimethyl cyclohexane], "LUPERCO" 231-SRL [1,1-di(t-butylperoxy)-3,3,5-trimethyl cyclohexane], "LUPERSOL" 331-80B [1,1-di(t-butylperoxy)cyclohexane], "LUPERCO" 331-XL [1,1-di(t-butylperoxy)cyclohexane], "LUPERSOL" 531-80B [1,1-di(t-amylperoxy)cyclohexane], "LUPERSOL" 531-80M [1,1-di(t-amylperoxy)cyclohexane], "LUPERSOL" 220-D50 [2,2-di(t-butylperoxy)butane], "LUPERSOL" 233-M75 [ethyl-3,3-di(t-butylperoxy)butyrate], "LUPERCO" 233-XL [ethyl-3,3-di(t-butylperoxy)butyrate], "LUPERSOL" P-31 [2,2-di-(t-amylperoxy)propane], "LUPERSOL" P-33 [2,2-di-(t-amylperoxy) propane], and "LUPERSOL" 553-M75 [ethyl 3,3-di(t-amylperoxy)butyrate].

Other thermally-activated latent curing compositions include those available commercially from DuPont under the "VAZO" tradename, such as "VAZO" 64 (azobisisobutyrile nitrile), "VAZO" 67 (butane nitrile, 2-methyl, 2,2'-azobis) and "VAZO" 88 (cyclohexane carbonitrile, 1,1'-azobis).

The radical cure-inducing composition should be present generally within the range of from about 0.001 phr to about 10 phr, such as from about 1 phr to about 5 phr.

Where an anaerobically curable composition is at hand, the inventive composition may also include other components common to conventional anaerobic adhesive formulation, such as free-radical initiators, free-radical accelerators, inhibitors of free-radical generation, as well as metal catalysts.

A number of well-known initiators of free-radical polymerization may be incorporated into compositions of the present invention including, without limitation, hydroperoxides, such as cumene hydroperoxide ("CHP"), para-menthane hydroperoxide, t-butyl hydroperoxide ("TBH") and t-butyl perbenzoate.

Such peroxide compounds may be employed in the present invention in the range of from about 0.1 phr to about 10 phr, with about 0.5 phr to about 5 phr being desirable.

Stabilizers and inhibitors (such as phenols including hydroquinone and quinones) may also be employed to control and prevent premature peroxide decomposition and polymerization of the composition of the present invention, as well as chelating agents [such as diethylenetriamine pentaacetic acid ("DTPA") or the tetrasodium salt of ethylenediamine tetraacetic acid ("EDTA")] to remove trace amounts of metal contaminants therefrom.

Accelerators may be employed to enhance the rate of cure propagation, such as in amounts in the range of about 0.1 phr to about 5 phr, desirably about 1 phr to about 3 phr. When the accelerator is in the form of a metal catalyst solution or a pre-mix, it may be used in an amount in the range of about 0.03 phr to about 0.1 phr. Other agents such as thickeners, plasticizers, fillers, and other well-known additives may be incorporated in the inventive composition where the art-skilled person believes it would be desirable to do so.

The compositions of the present invention may be prepared using conventional methods which are well known to those persons of skill in the art. For instance, the components of the inventive compositions may be combined together with mixing in any convenient order consistent with the roles and functions the components are to perform in the compositions. Conventional mixing techniques using known apparatus may be employed.

The compositions of this invention may be applied to a variety of substrates, such as steel, brass, aluminum, zinc and other metals and alloys. In addition, in the context of anaerobic adhesives, synthetic or composite substrates may be used, provided an appropriate primer or activator composition is first applied thereon, if necessary.

The compositions of this invention may also be used to impregnate the pores of substrates constructed from such materials. See e.g., U.S. Pat. No. 5,618,857, the disclosure of which is hereby expressly incorporated herein by reference.

The following examples are provided to further illustrate the present invention. Many other practical opportunities exist with respect to the teaching herein, which will become readily apparent to those persons of skill in the art upon a review of the examples.

EXAMPLES

I. Synthetic Procedures

A. Procedure for the Preparation of Benzoyl Imidizoles

To a one liter three neck reaction flask, equipped with a mechanical stirrer, condenser, thermometer, addition funnel, and nitrogen inlet, was added the imidizole and 400 ml of toluene under nitrogen. The mixture was stirred until the imidizole dissolved and 25 grams of $Na_2CO_3$ was added. Benzoyl chloride was dissolved in 100 ml of toluene and added dropwise over 5 minutes to the reaction mixture. After the addition was complete, an additional 25 grams of $Na_2CO_3$ was added and the reaction mixture was heated to reflux. The reaction was heated overnight, and then allowed to cool to room temperature. The organic layer was washed three times with 500 mls of water, dried over anhydrous $MgSO_4$, and filtered. Solvent was then removed under reduced pressure and the product was dried under high vacuum. The product was used without further purification because of the high purity indicated by $^1H$ NMR analyses.

1. Benzoyl Imidizole ("BI")

Benzoyl imidizole was prepared by the above procedure using benzoyl chloride (28.1 grams, 200 mmole) and imidizole (14.3 grams, 210 mmole), in an amount of 24.3 grams (71% yield).

$^1H$ NMR and IR spectroscopy confirmed the identity of benzoyl imidizole: $^1H$ NMR ($CDCl_3$) δ8.1 (s, 1, N=CH—N), 7.4–8.0 (m, 5, ArH), 7.6 (s, 1, =CH), 7.2 (s, 1, =CH); IR (neat) 3127, 1709, 1371 $cm^{-1}$.

2. Benzoyl Methylimidizole ("BMI")

Benzoyl imidizole was prepared by the above procedure using benzoyl chloride (28.1 grams, 200 mmole) and 2-methylimidazole (16.4 grams, 210 mmole), in an amount of 22.4 grams (60% yield).

$^1H$ NMR and IR spectroscopy confirmed the identity of benzoyl methylimidizole: $^1H$ NMR ($CDCl_3$) δ7.5–7.9 (m, 5, ArH), 7.1 (s, 1, =CH), 6.9 (s, 1, =CH), 2.7 (s, 1, $CH_3$),; IR (neat) 3116, 1705, 1317 $cm^{-1}$.

3. Phthaloyl Diimidizole ("PDI")

To a one liter three neck reaction flask, equipped with a mechanical stirrer, condenser, thermometer, addition funnel, and nitrogen inlet, was added imidizole (14.3 grams, 210 mmole) and 400 ml of toluene under nitrogen. The mixture was stirred until the imidizole dissolved and 25 grams of $Na_2CO_3$ was added. Phthaloyl chloride (20.2 grams, 100 mmole) was dissolved in 100 ml of toluene and added dropwise over 5 minutes to the reaction mixture. After the addition was complete, an additional 25 grams of $Na_2CO_3$ was added and the reaction mixture was heated to reflux. The reaction was heated overnight and then cooled to room temperature. The product precipitated as a light yellow solid. To the reaction flask was added 400 ml of water to dissolve any inorganic salts. The mixture was stirred for an additional 10 minutes. The product was filtered, washed twice with 400 mls of water, and then dried overnight at ambient temperature under high vacuum. The phthaloyl diimidizole was obtained in an amount of 11.5 grams (43% yield), and used without further purification.

$^1H$ NMR and IR spectroscopy confirmed the identity of phthaloyl diimidizole: $^1H$ NMR ($CDCl_3$) δ8.2 (s, 1, N=CH—N), 8.0 (s, 4, ArH), 7.6 (s, 1, =CH), 7.2 (s, 1, =CH); IR (KBr) 3130, 1710, 1371 $cm^{-1}$.

II. Preparation of Radical-Curable Adhesive Compositions

We prepared radical-curable adhesive compositions using ETPTMA (50 phr), and the components and amounts indicated below in Table 1. In addition, the compositions were rendered anaerobically curable through the addition of about 4.5 phr of an anaerobic cure-inducing composition. The composition included about 1.7 phr of saccharin, about 1.34 phr of N,N-dimethyl-p-toluidene, and about 1.63 phr of cumene hydroperoxide.

For comparative purposes, two compositions (Sample Nos. 1 and 4) contained no thermal resistance-conferring agent and two (Sample Nos. 8 and 9) contained a maleimide instead of any thermal resistance-conferring agent according to this invention.

TABLE 1

| Sample No. | (Meth)acrylate Type | Amt (phr) | Thermal Resistance Conferring Agent Type | Amt (phr) | Maleimide (17 phr) |
|---|---|---|---|---|---|
| 1 | TRIEGMA | 100 | — | — | — |
| 2 | TRIEGMA | 100 | PN-23 | 10 | — |
| 3 | TRIEGMA | 100 | PN-23 | 20 | — |
| 4 | ETMPTA CTMA | 50 50 | — | — | — |
| 5 | ETMPTA CTMA | 50 50 | PN-23 | 5 | — |
| 6 | ETMPTA CTMA | 50 50 | PN-23 | 10 | — |
| 7 | ETMPTA CTMA | 50 50 | PN-23 | 20 | — |
| 8 | TRIEGMA | 100 | — | — | HVA-2 |
| 9 | ETMPTA CTMA | 50 50 | — | — | HVA-2 |
| 10 | ETMPTA CTMA | 50 50 | MI | 1 | — |
| 11 | ETMPTA CTMA | 50 50 | MI | 2 | — |
| 12 | ETMPTA CTMA | 50 50 | MI | 4 | — |
| 13 | ETMPTA CTMA | 50 50 | BI | 2 | — |
| 14 | ETMPTA CTMA | 50 50 | BI | 4 | — |
| 15 | ETMPTA CTMA | 50 50 | BI | 8 | — |
| 16 | ETMPTA CTMA | 50 50 | PDI | 1.5 | — |
| 17 | ETMPTA CTMA | 50 50 | PDI | 3 | — |
| 18 | ETMPTA CTMA | 50 50 | PDI | 6 | — |

Initially, the compositions were prepared by adding with mechanical mixing at room temperature the (meth)acrylate component and the thermal resistance-conferring agent, "AJICURE" PN-23, to 50 ml beakers, and thereafter adding the appropriate amounts of the components of the desired anaerobic cure-inducing composition (save cumene hydroperoxide).

The components were mixed for an appropriate period of time to allow for dissolution of all of the solid components. Cumene hydroperoxide was then added portionwise, with mixing continued for an additional period of time of about 0.5 hours.

The so-formed formulations were stored for further use by covering the beaker ensuring that an air pocket remained between the surface of the formulation and the cover.

III. Application of Radial-Curable Adhesive Compositions to Desired Substrate, and Cure Thereof The compositions were applied to grit-blasted mild steel lap shears assembled with a one-half inch overlap. The lap shears were clamped together and allowed to cure at room temperature for a period of time of about 24 hours. After the cure time, the lap shear assemblies were evaluated for strength and thermal performance.

IV. Elevated Temperature Performance of Cured Adhesive Compositions

Five sets of the lap shear assemblies were evaluated for adhesive strength after the initial cure, and then after a period of time of about 1 day and 7 days at elevated temperature conditions of about 250° C. The evaluation was performed in accordance with test method, ASTM D-1002, where the assemblies were evaluated for adhesive strength at room temperature. The room temperature strength data for these samples are set forth below in Table 2.

TABLE 2

| Sample No. | Lapshear Adh. Str. (psi) [@ 250° C. over time (days)] | | |
|---|---|---|---|
| | initial | 1 | 7 |
| 1 | 926 | 0 | 0 |
| 2 | 954 | 782 | 0 |
| 3 | 1,137 | 1,153 | 0 |
| 4 | 478 | 0 | 0 |
| 5 | 838 | 945 | 0 |
| 6 | 450 | 1,057 | 799 |
| 7 | 1,575 | 1,697 | 2,047 |
| 8 | 953 | 1,501 | 1,066 |
| 9 | 838 | 945 | 0 |
| 10 | 433 | 0 | 0 |
| 11 | 0 | 245 | 0 |
| 12 | 0 | 304 | 233 |
| 13 | 597 | 436 | 0 |
| 14 | 604 | 467 | 947 |
| 15 | 592 | 594 | 828 |
| 16 | 0 | 0 | 0 |
| 17 | 0 | 307 | 0 |
| 18 | 0 | 391 | 0 |

Figure 2:
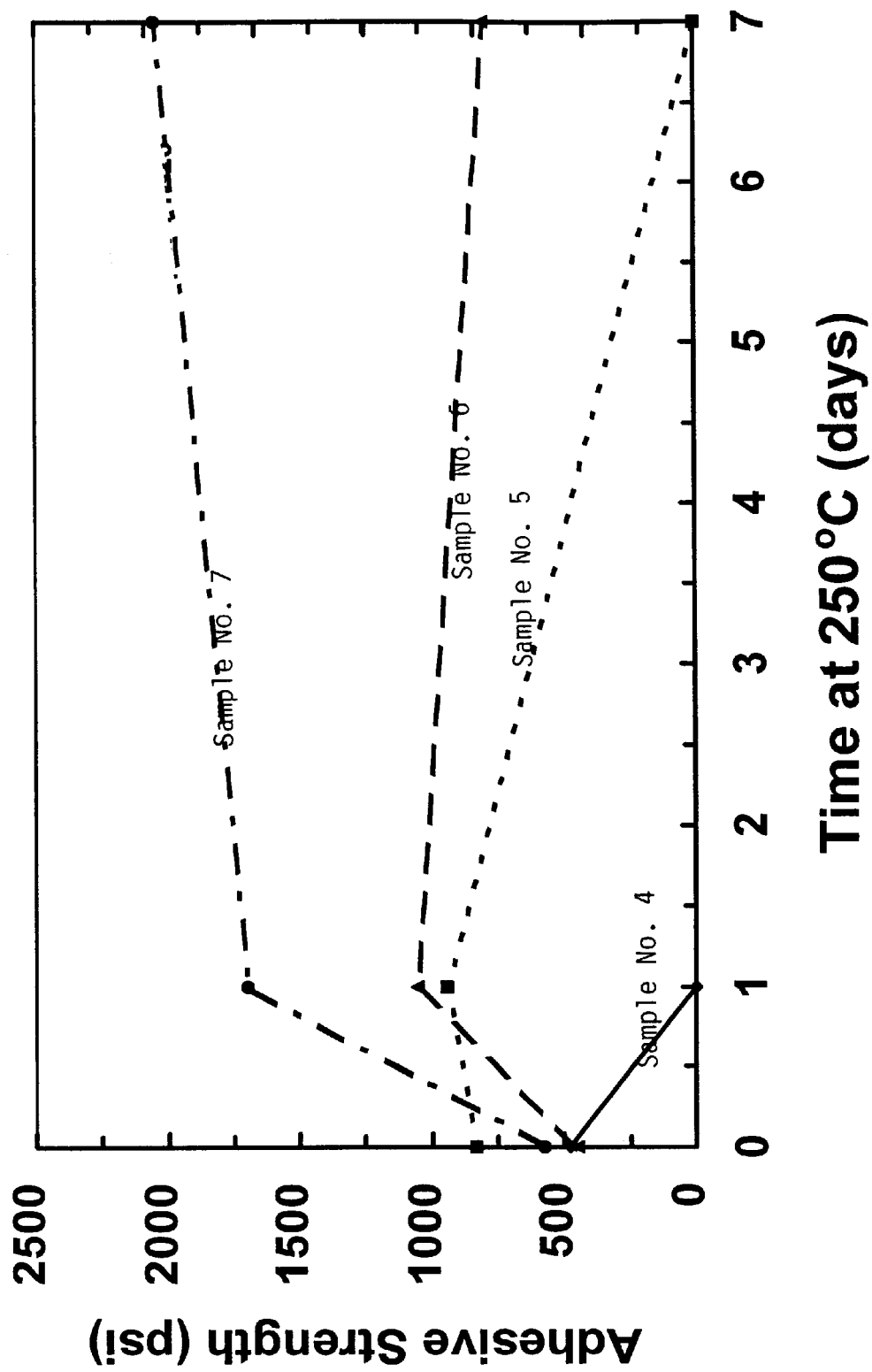
FIG. 2 depicts a plot of adhesive strength over time at a temperature of 250° C. for a reaction product of an anaerobic adhesive based on CTMA, both with and without "AJICURE" PN-23 as a thermal resistance-conferring agent.

Reference to FIGS. 1 and 2 shows the ability of "AJICURE" PN-23 to improve the resistance to thermal degradation over time of cured anaerobic adhesives based on TRIEGMA (compare Sample Nos. 2 and 3 to Sample No. 1) and CTMA (compare Sample Nos. 5, 6 and 7 to Sample No. 9), and the beneficial affect on the cured adhesive as regards thermal properties as the level of the thermal resistance-conferring agent is increased.

Figure 3:
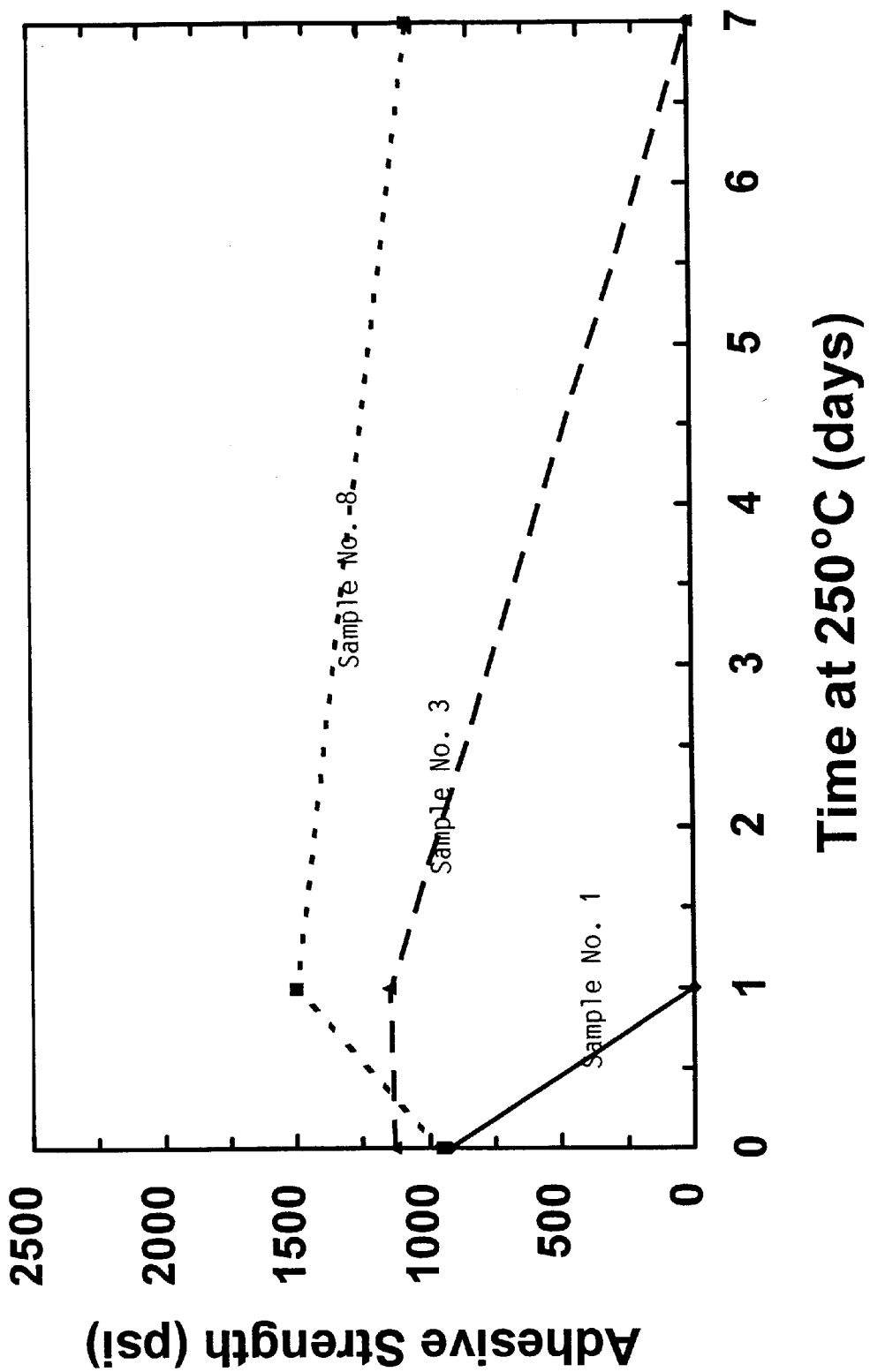
FIG. 3 depicts a plot of adhesive strength over time at a temperature of 250° C. for a reaction product of an anaerobic adhesive based on TRIEGMA, with "AJICURE" PN-23 (according to the present invention) and the maleimide, HVA-2, as a thermal resistance-conferring agent, and without any such agent.
Figure 4:
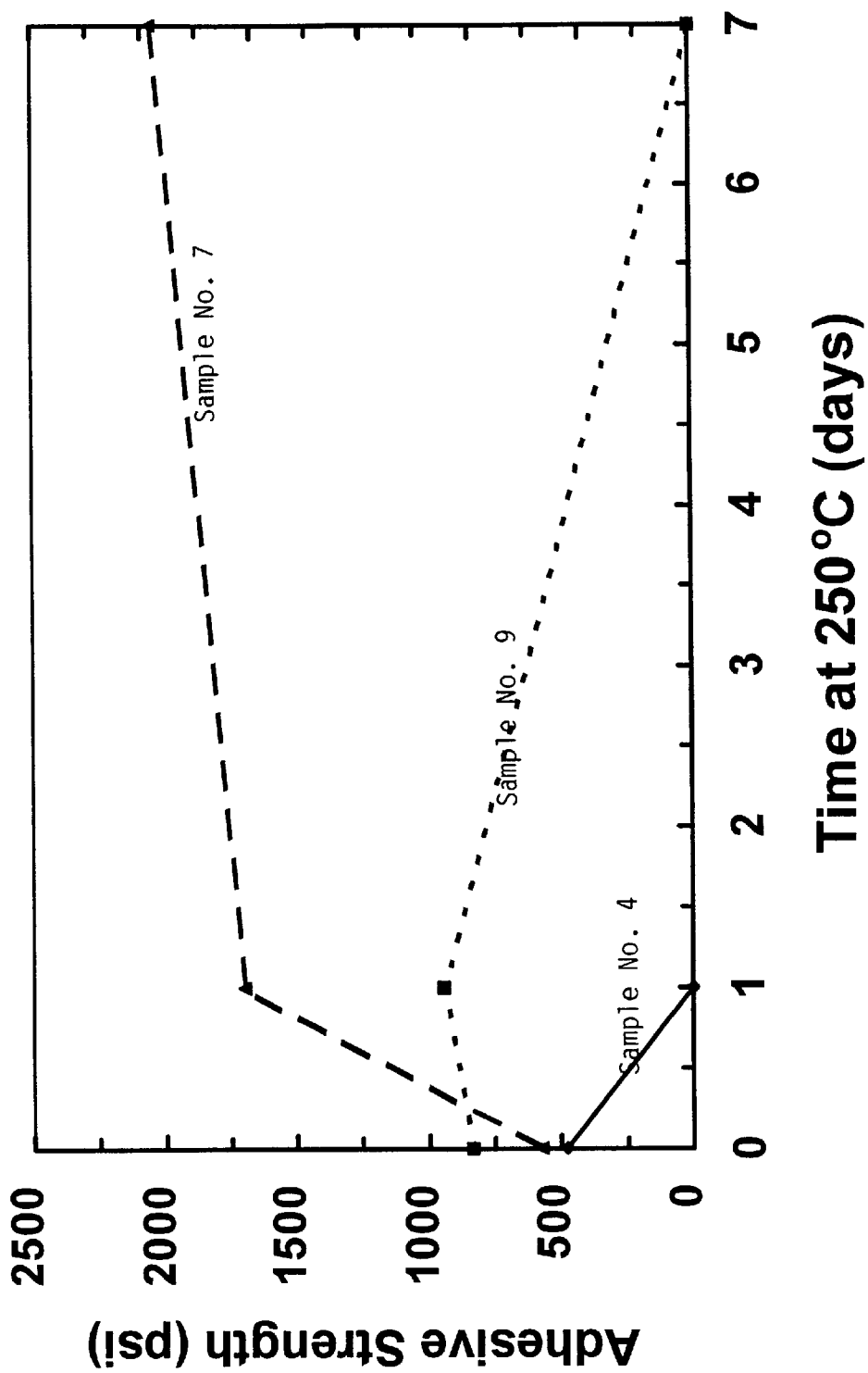
FIG. 4 depicts a plot of adhesive strength over time at a temperature of 250° C. for a reaction product of an anaerobic adhesive based on CTMA, with "AJICURE" PN-23 (according to the present invention) and the maleimide, HVA-2, as a thermal resistance-conferring agent, and without any such agent.
Figure 5:
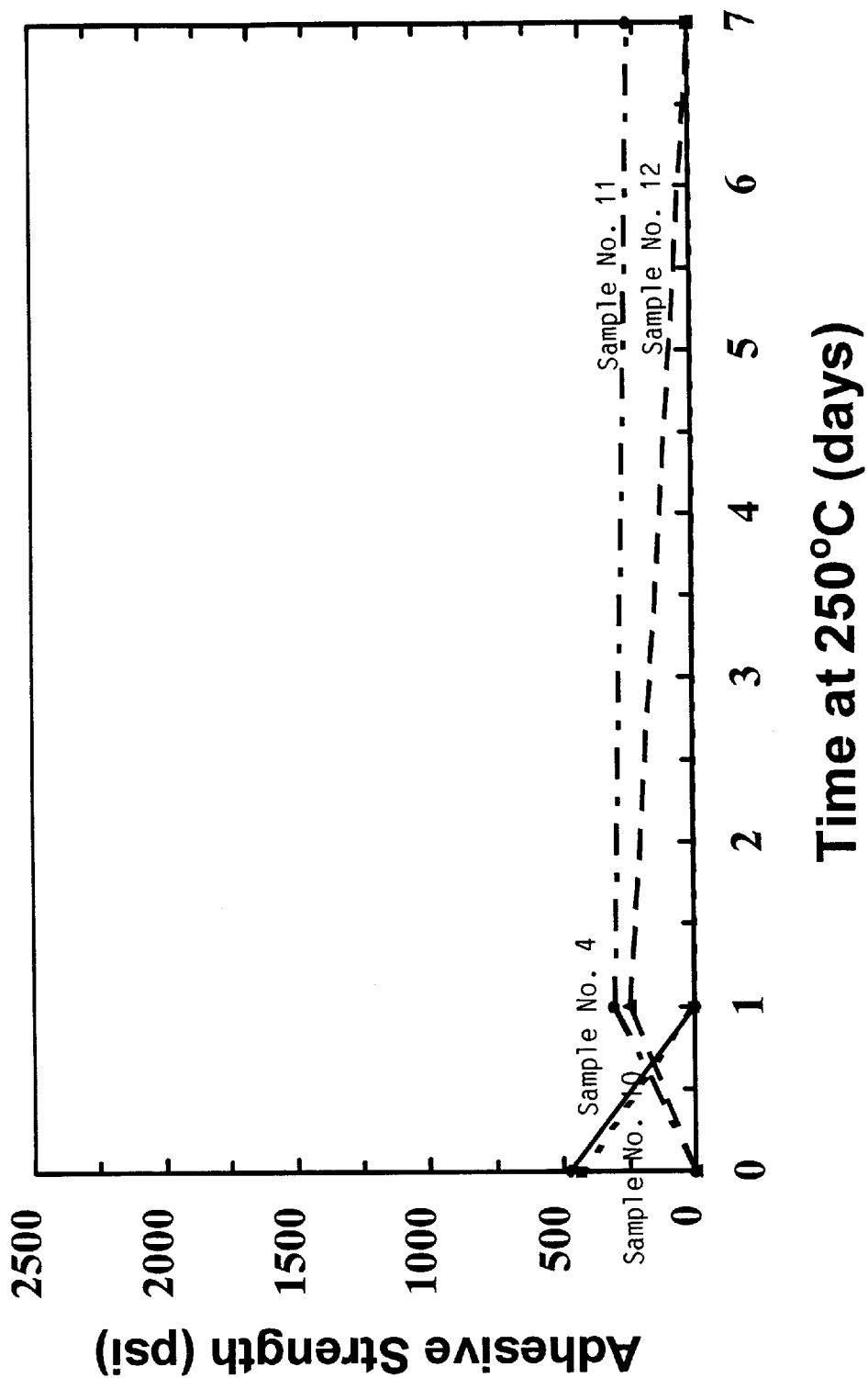
FIG. 5 depicts a plot of adhesive strength over time at a temperature of 250° C. for a reaction product of an anaerobic adhesive based on CTMA, both with and without methyl imidizole as a thermal resistance-conferring agent.
Figure 6:
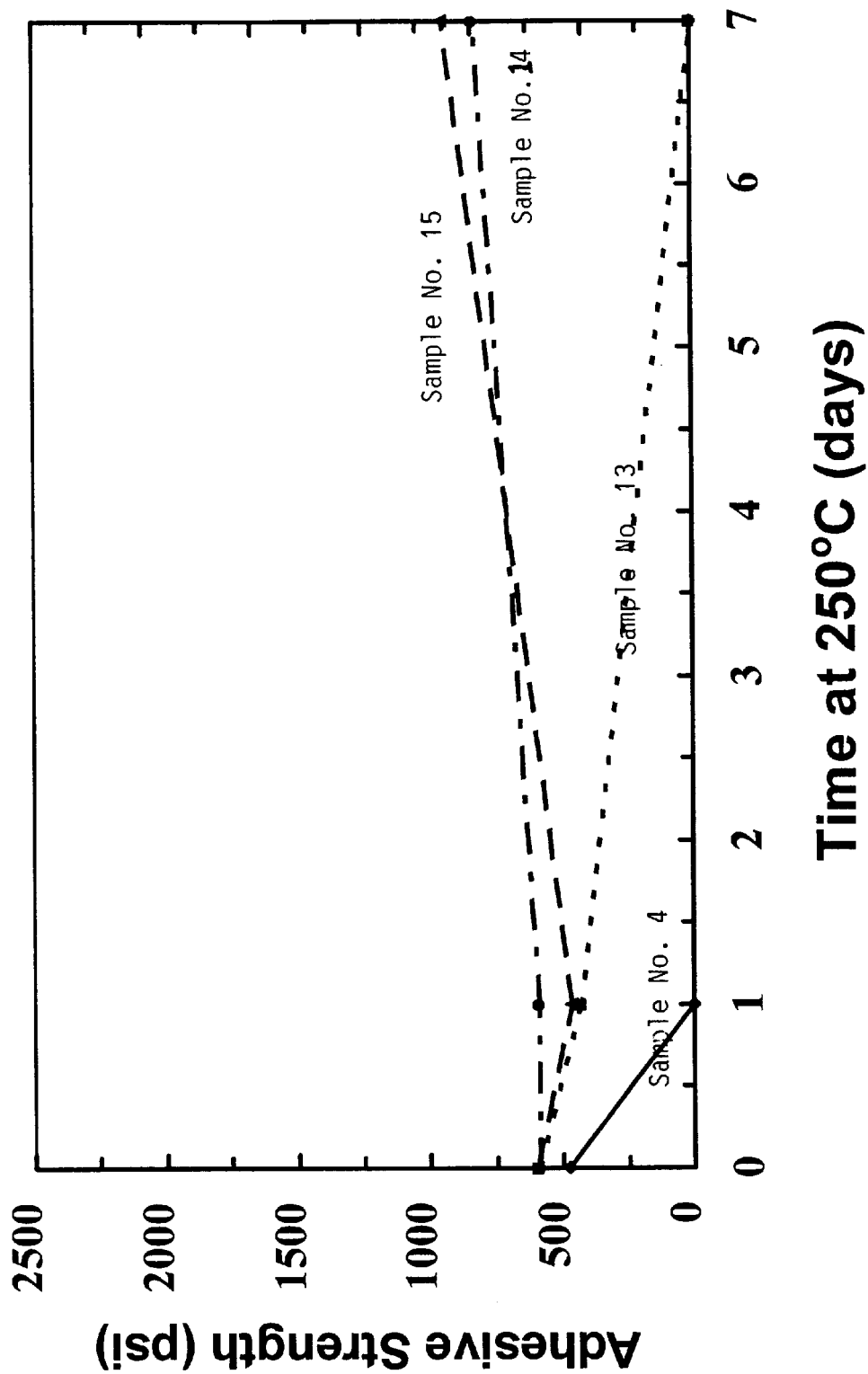
FIG. 6 depicts a plot of adhesive strength over time at a temperature of 250° C. for a reaction product of an anaerobic adhesive based on CTMA, both with and without methyl benzoyl imidizole as a thermal resistance-conferring agent.
Figure 7:
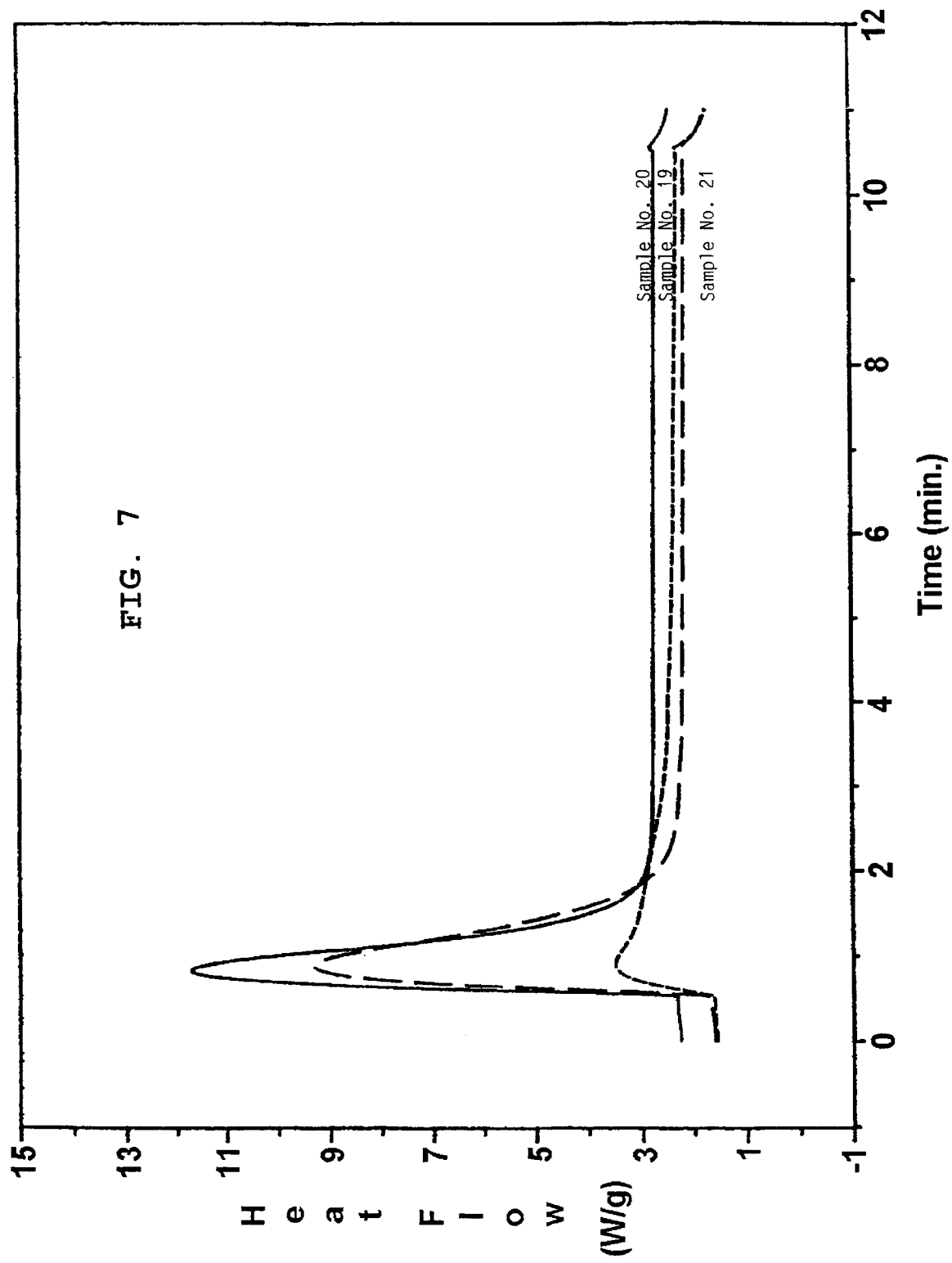
FIG. 7 depicts a plot of heat flow over time for (meth)acrylate-based adhesive compositions, with and without thermal resistance-conferring agents—the thermal resistance-resistance conferring agents being "AJICURE" PN-23 (according to the present invention) and the maleimide, HVA-2.

Reference to FIGS. 3 and 4 also shows the ability of "AJICURE" PN-23 to improve the resistance to thermal degradation over time of cured anaerobic adhesives based on TRIEGMA (Sample No. 8, FIG. 3) and CTMA (Sample No. 9, FIG. 5), over the cured anaerobic adhesives without the added "AJICURE" PN-23 (TRIEGMA, Sample No. 1, FIG. 3 and CTMA, Sample No. 4, FIG. 4). While it is seen that HVA-2 improved the thermal resistance to an even greater degree in either the TRIEGMA- or CTMA-based cured anaerobic adhesives, there may exist commercial applications where such an improvement is not necessary, and therefore the added expense of a HVA-2-containing anaerobic adhesive may not be commercially justified. And reference to FIGS. 5 and 6 shows the ability of MI and BI to function as a thermal resistance-conferring agent in accordance with this invention.

PHOTOINITIATED FORMULATIONS

The addition of maleimide-type materials, such as HVA-2, to conventional UV curable (meth)acrylate-based adhesive and sealant compositions for the purpose of improving thermal stability ordinarily inhibits the ability of the composition to cure under exposure to UV radiation. Therefore, while the HVA-2 confers thermal stability ordinarily, it frustrates the curing mechanism of such compositions.

Unlike maleimide-type materials, the addition of imidizole derivatives or latent imidizoles, such as adducts obtained by reacting a compound having an active hydrogen together with a tertiary amino group in the molecule, and epoxy compound and a carboxylic acid anhydride as described in the '155 patent, particularly "AJICURE" PN-23, have been found to not inhibit the ability of such compositions to cure under exposure to UV radiation. And surprisingly such materials show thermal resistance-conferring properties.

A UV curable composition (Sample No. 19) was prepared from the combination of ETMPTA (20 phr) and CTA (80 phr) as the (meth)acrylate component, "DAROCUR" 1173 (4 phr) as a photoinitiator and "AJICURE" PN-23 (10 phr) as the thermal resistance-conferring agent. For comparative purposes, two additional compositions were prepared—one without "AJICURE" PN-23 (Sample No. 20) and one with HVA-2 (17 phr) instead of "AJICURE" PN-23 (Sample No. 21).

In applying these samples onto glass substrates, ASTM 700.10 was followed in the assembly procedure for UV/visible light curing adhesives, and ASTM 714 was followed in measuring the fixture of UV/visible light curing adhesives, data for the latter of which is shown below in Table 6.

TABLE 6

| Sample No. | Fixture Time (secs) |
|---|---|
| 19 | 5 |
| 20 | 5 |
| 21 | 30 |

Indeed, photodifferential scanning calerimetry ("PDSC"), using a TA Instruments, Model 930 PDSC, demonstrates this remarkable difference in the effects of imidizole derivatives and latent imidizole as contrasted to maleimide-type materials, when used as thermal stabilizing agents for UV curable adhesive and sealant compositions. See FIG. 3.

The addition of the "AJICURE" PN-23 did not hinder the composition from curing when exposed to UV radiation (e.g., 76 mW/cm$^2$), while allowing the fixture time to remain substantially the same as the control, without the thermal-resistance conferring agent.

These examples are provided solely for illustrative purposes, and are in no way intended to limit the spirit and scope of the invention as defined by the claims.

What is claimed is:

1. A radical curable composition, radical cured reaction products of which demonstrate improved adhesion and resistance to thermal degradation at elevated temperatures, comprising:
   (a) a (meth)acrylate component;
   (b) an effective amount of latent imidazole as a thermal resistance conferring agent;
   (c) a radical cure-inducing composition, wherein the latent imidazole is an adduct obtained by a reacting a compound having an active hydrogen together with a tertiary amino group, an epoxy compound and a carboxylic acid anhydride.

2. The composition according to claim 1, wherein the thermal resistance-conferring agent is a member selected from the group consisting of methyl imidizole, benzoyl imidizole, benzoyl methylimidizole, phthaloyl diimidizole and combinations thereof.

3. The composition according to claim 1, wherein the (meth)acrylate component is represented by H$_2$C=CGCO$_2$R$_6$, wherein G is a member selected from the group consisting of hydrogen, halogen or alkyl of 1 to about 4 carbon atoms, and R$_6$ is a member selected from the group consisting of alkyl, cycloalkyl, alkenyl, cycloalkenyl, alkaryl, aralkyl and aryl groups having from 1 to about 16 carbon atoms, any of which may be optionally substituted or interrupted with a member selected from the group consisting of silane, silicon, oxygen, halogen, carbonyl, hydroxyl, ester, carboxylic acid, urea, urethane, carbamate, amine, amide, sulfur, sulonate and sulfone.

4. The composition according to claim 1, wherein the (meth)acrylate component is a member selected from the group consisting of polyethylene glycol di(meth)acrylates, bisphenol-A di(meth)acrylates, ethoxylated bisphenol-A (meth)acrylate, tetrahydrofurane (meth)acrylates, tetrahydrofurane di(meth)acrylates, citronellyl acrylate, citronellyl methacrylate, hydroxypropyl (meth)acrylate, hexanediol di(meth)acrylate, trimethylol propane tri(meth)acrylate, tetrahydrodicyclopentadienyl (meth)acrylate, ethoxylated trimethylol propane triacrylate, triethylene glycol acrylate, triethylene glycol methacrylate and an acrylate ester corresponding to

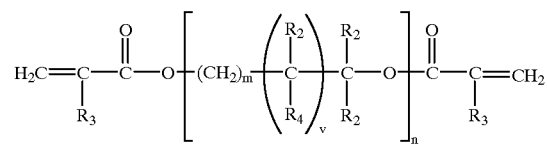

wherein R$_2$ is a member selected from the group consisting of hydrogen, and alkyl and hydroxyalkyl groups having from 1 to about 4 carbon atoms and

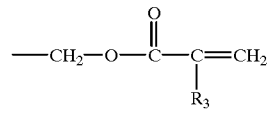

R$^3$ is a member selected from the group consisting of hydrogen, halogen, and alkyl groups having from 1 to about 4 carbon atoms;

R$^4$ is a member selected from the group consisting of hydrogen, hydroxy and

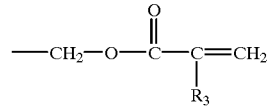

m is an integer equal to at least 1;
n is an integer equal to at least 1; and
v is 0 or 1,
and combinations of the above acrylate components.

5. The composition according to claim 1, wherein the radical cure-inducing composition is selected from the group consisting of anaerobic curing-inducing compositions, photoinitiated cure-inducing compositions, thermally-activated cure-inducing compositions, and combinations thereof.

6. The composition according to claim 5, wherein the anaerobic cure-inducing composition comprises saccharin, toluidenes, acetyl phenylhydrazine, and maleic acid.

7. The composition according to claim 5, wherein the thermally-activated composition is a member selected from the group consisting of peroxides, hydroperoxides, 2,4-pentanedione peroxide, di(n-propyl)peroxydicarbonate, di(s-butyl)peroxydicarbonate, di(2-ethylhexyl) peroxydicarbonate, diisononanoyl peroxide, benzoyl peroxide, α-cumylperoxy neodecanoate, 1,1-dimethyl-3-hydroxy-butyl peroxyneoheptanoate, α-cumyl peroxyneoheptanoate, t-amylperoxy neodecanoate, t-butylperoxy neodecanoate, t-butylperoxy neodecanoate, t-amylperoxypivalate, t-butylperoxypivalate, 1,1-dimethyl-3-hydroxy-butylperoxy-2-ethylhexanoate, 2,5-dimethyl-2,5-di(2-ethylhexanoyl peroxy)hexane, t-amylperoxy-2-ethylhexanoate, t-butyl peroctanoate, t-butylperoxy-2-ethylhexanoate, t-butyl peroxyisobutyrate, t-butyl peroxymaleic acid, t-butyl peroxyacetate, t-amyl peroxyacetate, di-t-butyl diperoxyphthalate, OO-t-butyl-O-isopropyl monoperoxycarbonate, 2,5-dimethyl-2,5-di (benzoylperoxy)hexane, OO-t-butyl-O-(2-ethylhexyl) monoperoxycarbonate, OO-t-amyl-O-(2-ethylhexyl) monoperoxycarbonate, dicumyl peroxide, 2,5-dimethyl-2,5-di-(t-butylperoxy)hexane, t-butyl cumyl peroxide, αα-bis(t-butylperoxy)diisopropylbenzene, 2,5-dimethyl-2,5-di-(t-butylperoxy)hexyne-3, 2,5-dihydro-peroxy-2,5-dimethylhexane, n-butyl-4,4-di-(t-butylperoxy)valerate, 1,1-di(t-butylperoxy)-3,3,5-trimethyl cyclohexane, 1,1-di(t-butylperoxy)cyclohexane, 2,2-di(t-butylperoxy)butane, ethyl-3,3-di(t-butylperoxy)butyrate, 2,2-di-(t-amylperoxy) propane, ethyl 3,3-di(t-amylperoxy)butyrate, azobis-isobutyrile nitrile, butane nitrile, 2-methyl, 2,2'-azobis, cyclohexane carbonitrile, 1,1'-azobis and combinations thereof.

8. The compositions according to claim 5, wherein the photoinitiated cure-inducing composition is a member selected from the group consisting of 1-hydroxycyclohexyl phenyl ketone, (2-methyl-1-[4-(methylthio)phenyl]-2-morpholino propan-1-one), 2-benzyl-2-N,N-dimethylamino-1-(4-morpholinophenyl)-1-butanone, 1-hydroxy cyclohexyl phenyl ketone, benzophenone, 2,2-dimethoxy-2-phenyl acetophenone, bis(2,6-dimethoxybenzoyl-2,4-,4-trimethyl pentyl)phosphine oxide, 2-hydroxy-2-methyl-1-phenyl-propan-1-one, 2-hydroxy-2-methyl-1-phenyl-1-propane, 2,4,6-trimethylbenzoyldiphenyl-phosphine oxide, 2-hydroxy 2-methyl-1-phenyl-propan-1-one, mixed triaryl sulfonium hexafluoroantimonate salts, mixed triaryl sulfonium hexafluorophosphate salts, dl-camphorquinone, benzil dimethyl ketal, benzoin butyl ethers, trimethylbenzophenone blend, α-hydroxy ketone, polymeric hydroxy ketone, triphenyl phosphine oxide, 2- and 4-isopropylthioxanthone, ethyl 4-(dimethyl amino)benzoate, diaryl iodonium hexafluoroantimonate, triaryl sulfonium hexafluorophosphate, and combinations thereof.

9. Reaction products formed from the composition according to claim 1, upon exposure to conditions in which air is substantially excluded therefrom under ambient temperature conditions.

10. Reaction products formed from the composition according to claim 1, upon exposure to conditions in which (a) air is substantially excluded therefrom and (b) the temperature conditions are elevated beyond room temperature.

11. Reaction products formed from the composition according to claim 8, upon exposure to UV radiation.

12. A process for preparing the reaction product from the radical-curable adhesive composition according to claim 1, the steps of which include:

applying the composition to a substrate surface and exposing the coated substrate surface to conditions which are appropriate to effect cure thereof.

13. A process for preparing a radical-curable adhesive composition according to claim 1, the step of which includes:

combining with mixing the (meth)acrylate component, the thermal resistance-conferring agent, and the radical cure-inducing composition.

* * * * *

UNITED STATES PATENT AND TRADEMARK OFFICE
CERTIFICATE OF CORRECTION

PATENT NO.    : 6,342,545 B1
DATED         : January 29, 2002
INVENTOR(S)   : Philip Klemarczyk et al.

It is certified that error appears in the above-identified patent and that said Letters Patent is hereby corrected as shown below:

Column 4,
Line 9, change "imidizoles" to -- imidazoles --
Line 9, change "imidizole" to -- imidazole --
Line 11, change both occurrences of "imidizole" to -- imidazole --
Line 11, change "methylimidizole" to -- methylimidazole --
Line 12, change "phthaloyldiimidizole" to -- phthaloyldiimidazole --
Line 17, change "imidizole" to -- imidazole --
Lines 54-55, change "bis(2,6-dimethoxybenzoyl-2,4-,4-trimethyl pentyl) phosphine oxide" to -- bis(2,6-dimethoxybenzoyl-2,4,4-trimethyl pentyl) phosphine oxide --

Column 7,
Line 55, change "Imidizoles" to -- Imidazoles --
Line 58, change "imidizole" to -- imidazole --
Line 60, change "imidizole" to -- imidazole --

Column 8,
Line 5, change "Imidizole" to -- Imidazole --
Line 6, change "imidizole" to -- imidazole --
Line 7, change "imidizole" to -- imidazole --
Line 12, change "imidizole" to -- imidazole --
Line 16, change "Methylimidizole" to -- Methylimidazole --
Line 17, change "imidizole" to -- imidazole --
Line 23, change "methylimidizole" to -- methylimidazole --
Line 26, change "Diimidizole" to -- Diimidazole --
Line 30, change "imidizole" to -- imidazole --
Line 32, change "imidizole" to -- imidazole --
Line 45, change "diimidizole" to -- diimidazole --
Line 50, change "diimidizole" to -- diimidazole --

Column 10,
Line 28, change "affect" to -- effect --
Lines 56-57, change "imidizole" to -- imidazole --
Line 57, change "imidizoles" to -- imidazoles --

UNITED STATES PATENT AND TRADEMARK OFFICE
CERTIFICATE OF CORRECTION

PATENT NO.    : 6,342,545 B1
DATED         : January 29, 2002
INVENTOR(S)   : Philip Klemarczyk et al.

It is certified that error appears in the above-identified patent and that said Letters Patent is hereby corrected as shown below:

Column 11,
Line 26, change "imidizole" to -- imidazole --
Line 27, change "imidizole" to -- imidazole --
Line 44, before "latent" insert -- a --
Line 45, after "agent;" insert -- and --
Line 47, delete first occurrence of "a"
Line 53, change "imidizole" to -- imidazole --
Line 54, change "imidizole" to -- imidazole --
Line 54, change "methylimidizole" to -- methylimidazole --
Line 54, change "diimidizole" to -- diimidazole --

Column 12,
Line 49, change "curing-inducing" to -- cure-inducing --

Signed and Sealed this

Twentieth Day of August, 2002

*Attest:*

*Attesting Officer*

JAMES E. ROGAN
*Director of the United States Patent and Trademark Office*